United States Patent
Reyland, Jr.

(10) Patent No.: US 8,811,546 B2
(45) Date of Patent: Aug. 19, 2014

(54) ADAPTIVE REFERENCE SYMBOL METHOD AND APPARATUS FOR A RECEIVER

(75) Inventor: John M. Reyland, Jr., Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 71 days.

(21) Appl. No.: 13/492,670

(22) Filed: Jun. 8, 2012

(65) Prior Publication Data
US 2013/0329837 A1    Dec. 12, 2013

(51) Int. Cl.
H04L 27/06    (2006.01)

(52) U.S. Cl.
USPC .......................................... 375/341; 714/786

(58) Field of Classification Search
USPC .......................................................... 375/341
See application file for complete search history.

(56) References Cited

U.S. PATENT DOCUMENTS

| | | | |
|---|---|---|---|
| 5,654,667 A | 8/1997 | Adachi | |
| 6,608,864 B1 * | 8/2003 | Strait | 375/233 |
| 7,496,165 B2 * | 2/2009 | Schur et al. | 375/346 |
| 8,068,564 B2 * | 11/2011 | Kolze et al. | 375/340 |
| 8,320,505 B2 * | 11/2012 | Yang et al. | 375/340 |
| 8,437,434 B1 * | 5/2013 | Lee et al. | 375/341 |
| 2002/0071501 A1 * | 6/2002 | Gu et al. | 375/321 |
| 2004/0021516 A1 * | 2/2004 | Oishi et al. | 330/149 |
| 2004/0146123 A1 | 7/2004 | Lai | |
| 2005/0271171 A1 * | 12/2005 | Schur et al. | 375/346 |
| 2005/0286649 A1 | 12/2005 | Redfern | |
| 2008/0056425 A1 | 3/2008 | Betts et al. | |
| 2008/0069274 A1 * | 3/2008 | Kopmeiners et al. | 375/341 |
| 2009/0141835 A1 * | 6/2009 | Yang et al. | 375/341 |
| 2010/0090945 A1 * | 4/2010 | Lee et al. | 345/156 |
| 2010/0166119 A1 * | 7/2010 | Wang et al. | 375/341 |
| 2011/0051859 A1 * | 3/2011 | Canpolat et al. | 375/341 |
| 2011/0051861 A1 * | 3/2011 | Yang | 375/341 |
| 2011/0305303 A1 * | 12/2011 | Sikri et al. | 375/341 |
| 2013/0040675 A1 * | 2/2013 | Ant et al. | 455/509 |

OTHER PUBLICATIONS

International search report and written opinion regarding International Application No. PCT/US2012/042987, mail date Feb. 21, 2013, 7 pages.

* cited by examiner

*Primary Examiner* — Santiago Garcia
(74) *Attorney, Agent, or Firm* — Donna P. Suchy; Daniel M. Barbieri

(57) ABSTRACT

A method uses a set of reference symbols. The method includes receiving a first symbol, comparing the first symbol to the set of reference symbols, and selecting a reference symbol from the set of possible reference symbols. The set of reference symbols are adjusted by a set of respective error factors for each of the reference symbols. The reference symbol is selected when it matches the first symbol. The method also includes adjusting the respective error factor for the reference symbol in accordance with a difference between the first symbol and a remodulated reference symbol in one embodiment.

20 Claims, 3 Drawing Sheets

US 8,811,546 B2

ADAPTIVE REFERENCE SYMBOL METHOD AND APPARATUS FOR A RECEIVER

BACKGROUND

The present disclosure relates generally to the field of signal processing. More particularly, the present disclosure relates to methods of and systems for decoding signals.

Signal processing is utilized in communication (e.g., radio, cell phone, etc.) and sensing applications (e.g., radars, imaging, etc.), as well as other applications. According to one particular application, signal processing is used in sensing and communications applications to obtain data that has been modulated on a radio frequency (RF) or optical signal.

Decoders are often provided in the signal processing path to detect symbols representative of data modulated on input signals. Decoders can be utilized in a variety of RF systems, including time division multiple access ("TDMA") systems, code division multiple access ("CDMA") systems, orthogonal frequency division multiple access ("OFDM") systems, etc. One example of a decoder is a maximum likelihood sequence estimator (MLSE) (e.g., a Viterbi decoder)

A Viterbi decoder is often utilized with continuous signals, such as signals using continuous phase modulation (CPM). There are many CPM signaling schemes including minimum shift key (MSK) modulation, continuous-phase frequency shift key (CPFSK) modulation, etc. Generally, a Viterbi decoder compares a demodulated signal in a base band frequency represented as a series of symbols with a set of reference symbols to determine which symbols have been transmitted.

RF signals, as well as other signals, can encounter impairments which can affect the ability of the decoder to determine the identity of the received symbol. In one example, symbol interference (e.g., intersymbol interference (ISI)) can perturb the received symbol when an RF signal is propagated through space. Accordingly, in conventional receiver architectures, the set of known reference patterns for all possible received symbols does not necessarily contain an exact match for an ISI corrupted received symbol.

Inter symbol interference and other impairments can be caused by satellite transponders or reflections off of surfaces such as aircraft or the like. Reference symbol patterns have been adjusted in accordance with an average phase error measured in the laboratory to accommodate changes in the received symbol pattern. However, this technique cannot adjust to errors that are not consistent or are not known in the laboratory.

Accordingly, there is a need for a system and method that improves symbol decoding. Further still, there is a need for a system and method of decoding that is adaptive. Yet further still, there is a need for a receiver that provides adaptive equalization for band limited continuous phase modulation. Yet further, there is a need for a decoder that adaptively compensates for intersymbol interference (ISI), such as ISI caused by channel filtering. Still further, there is a need for a system and for or a method of decoding symbols using reference symbols that are continually adjusted in accordance with real world errors.

Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a method of using a set of reference symbols. The method includes receiving a first symbol, comparing the first symbol to the set of reference symbols, and selecting a reference symbol from the set of reference symbols. The set of reference symbols are adjusted by a set of respective error factors, one for each of the reference symbols. The reference symbol is selected as the closest match to the first symbol. The method also includes adjusting the respective error factor for the reference symbol in accordance with a difference between the first symbol and the reference symbol. As the received symbols are generally corrupted by channel conditions (e.g. ISI), the error factors stored at the receiver provide information about the effect of this corruption on each possible received symbol. As the reception and decoding of the complete message progresses, the receiver "learns" and continues to refine this information in one embodiment.

Another exemplary embodiment relates to a decoder including an error generator and a symbol comparator. The error generator receives an input symbol and a modified reference symbol associated with the input symbol and provides an error associated with the input symbol. The symbol comparator compares the input symbol to a set of modified reference symbols and provides a selected reference symbol or identification of the selected reference symbol. The error generator is configured to modify the error factor associated with the selected reference symbol in accordance with the error.

Another exemplary embodiment relates to a receiver. The receiver includes a demodulator and an error circuit. The demodulator is for providing a complex base band signal. The error circuit is for modifying a reference symbol in accordance with a stored error factor. The reference signal is in a set of reference symbols. The error is associated with the difference between the reference symbol and an input symbol in the complex base band signal.

Another exemplary embodiment relates to a decoder including an error generator and a symbol comparator. The error generator receives an input symbol and a reference symbol associated with the input symbol and provides an error associated with the input symbol. The symbol comparator compares the input symbol to a set of reference symbols and selects the reference symbol. The reference symbol associated with the selection is modified in accordance with the error.

Another exemplary embodiment relates to a receiver. The receiver includes a demodulator and an error circuit. The demodulator is configured to provide an input symbol. The error circuit is configured to modify a reference symbol in accordance with an error. The reference symbol is in a set of reference symbols. The error is associated with the difference between the reference symbol and the input symbol.

BRIEF DESCRIPTION OF THE FIGURES

The exemplary embodiments will become more fully understood from the following detailed description, taken in conjunction with the accompanying drawings, wherein like reference numerals refer to like elements, in which.

DETAILED DESCRIPTION

Figure 1:
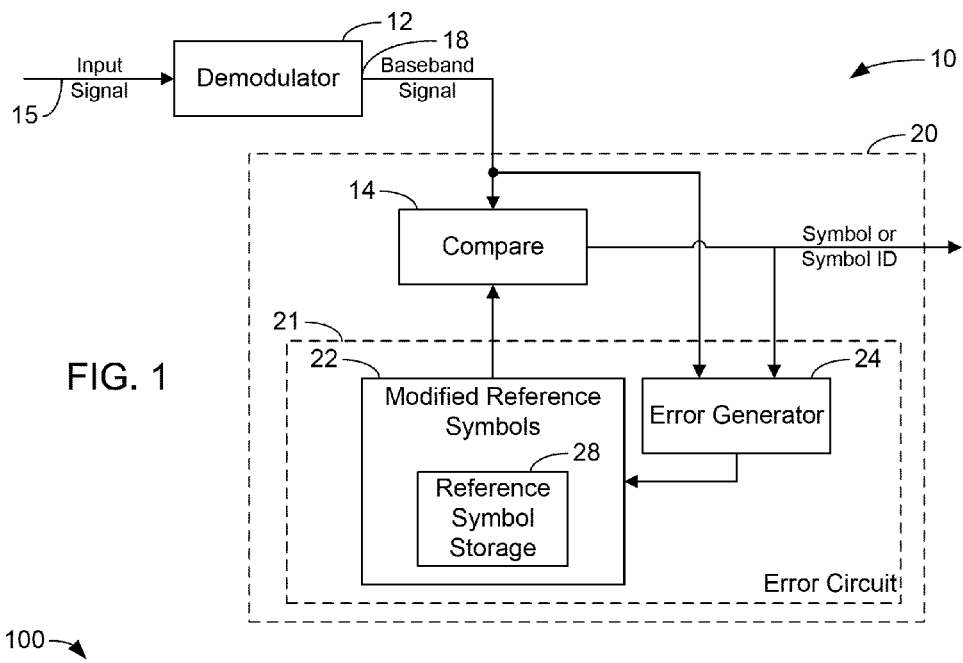
FIG. 1 is a general block diagram of a decoding system including an error circuit for adjusting or modifying reference symbols according to an exemplary embodiment.

Before describing in detail the particular improved system and method, it should be observed that the invention includes a novel structural combination of components, but is not limited to any particular detailed configurations thereof. Accordingly, the structure, methods, software, functions, control and arrangement of the components have been illustrated in the drawings by readily understandable block representations and schematic drawings in order not to obscure the disclosure with the structural details which will be readily apparent to one skilled in the art having the benefit of the description herein. Further, the invention is not limited to the particular embodiments depicted in the exemplary diagrams, but should be construed in accordance with the language of the claims.

Referring generally to the figures, an adaptive equalization technique for band limited signals used for digital data transmission achieves superior performance in one embodiment. According to one embodiment, the technique modifies reference symbols used in a receiver, such as a radio frequency (RF) receiver, a sensor (e.g., a radar, an imaging device, etc.), or other device. The receiver, sensor or other device can use the modified reference symbols in a decoder, such as a maximum likelihood sequence estimator (MLSE) or Viterbi decoder, in one embodiment.

Decoders can be utilized in a variety of systems such as time division multiplexing ("TDMA"), code division multiple access ("CDMA"), orthogonal frequency division multiplexing ("OFDM"), etc. A receiver, such as in a radio, sensor, radar, etc., often includes a decoder. The decoder can include an error generator for receiving an input signal and a modified reference symbol associated with the input symbol in one embodiment. The error generator provides an error associated with the input symbol. A symbol comparator compares the input symbol to a set of modified reference symbols and selects the reference symbol that is closest to the input signal in one embodiment. The selected reference symbol is modified in accordance with the error. Advantageously, the modification of the reference symbol corrects for or accommodates perturbed symbols due to intersymbol interference (ISI) in one embodiment.

With reference to FIG. 1, a system 10 can be embodied as a receiver and can include a decoder 20. System 10 receives an input signal at an input 15. The input signal can be from any type of source. In one embodiment, the input signal is a down converted RF signal used in a communication receiver. In an alternative embodiment, the input signal is an optical signal and can be converted to an electronic format for use in decoder 20. Decoder 20 can be used for preamble detection, data reception, signal identification and other receiver functions.

The input signal is demodulated by a demodulator 12. Demodulator 12 can be any type of demodulator employing any of various demodulation techniques. In one embodiment, demodulator 12 is an IQ demodulator and provides a complex baseband signal including phase modulated components (e.g., I and Q parameters representing input symbols). In one embodiment, demodulator 12 provides the complex base band signal at an output 18.

Decoder 20 includes a compare circuit 14 and an error circuit 21. Compare circuit 14 receives the base band complex signal at output 18 and modified reference signals from error circuit 21 in one embodiment. Error circuit 21 includes an error generator 24 and a modified reference symbol circuit 22. Modified reference symbol circuit 22 can include a reference symbol storage 28 for storing a set of reference symbols. In one embodiment, error generator 24 receives the complex base band signal from demodulator 12 at output 18 and a reference symbol, modified reference symbol, or symbol ID from compare circuit 14. The reference symbol or symbol ID is associated with the reference symbol to which an input symbol of the base band complex signal corresponds. Error generator 24 uses the reference symbol, or modified reference symbol, or the symbol ID to determine an error between the reference symbol or modified reference symbol and the complex base band signal (e.g., the input symbol representatively I and Q parameters). The result of the comparison can also be utilized by other portions of the system 10 (e.g., downstream data processing circuits, etc.) as well as by error circuit 21.

Error generator 24 in error circuit 21 provides an error parameter representative of the error to modified reference symbol circuit 22. Modified reference symbol circuit 22 provides a modified reference symbol, modified in accordance with the error parameter or error signal from error generator 24, for use in compare circuit 14. Alternatively, modified reference symbol circuit 22 can include a set of modified reference symbols which are continually updated in accordance with the error parameter or error signal provided by generator 24

Advantageously, receiver 10 achieves superior (i.e. lower) bit error rates by using the actual received signal to calculate an error and modifying the reference symbols in accordance with the error in one embodiment. The error is calculated for each reference symbol and the reference symbols are modified on a symbol-by-symbol basis in one embodiment. Accordingly, decoder 20 can compensate for respective errors associated with each symbol due to ISI in one embodiment. Advantageously, decoder 20 reduces the effect of ISI caused by channel filtering in one embodiment.

In one embodiment, decoder 20 is embodied as a Viterbi decoder using a trellis model for reference symbols. The reference symbols can include modulation indexes and symbols. The modulation indexes can be $h_0$, $h_1$, $h_2$, etc., in one embodiment. The symbols can be designated $\alpha$ and can be chosen from the set $\{-3, -1, 1, 3\}$, $\{-5, -3, -1, 1, 3, 5\}$, etc. The symbols can be assigned a series of modulation indexes so that $\alpha_n$ corresponds to $h_n$ in a series of symbols for index n=0, 1, . . . N. These symbols have a corresponding set of phase changes $\theta_1$, $\theta_2$, $\theta_3$ . . . $\theta_n$. The symbols above are exemplary only. Reference symbols (e.g., original symbols before modification that are known a priori at the receiver) can be stored in a reference symbol storage 28. Decoder 20 can be utilized with various reference symbol schemes without departing from the scope of the invention.

Error circuit 21 can be implemented in the complex base band in conjunction with Viterbi decoding in one embodiment. This approach requires far lower digital signal processor resource usage than optimal Viterbi equalization. Decoder 20 can be embodied as a digital signal processor programmed in accordance with the methods described herein, an application specific circuit (ASIC), a field programmable array (FPGA), a dedicated circuit, etc. Decoder 20 can be implemented using instructions stored in a non-transitory medium for the operations described below.

Figure 2:
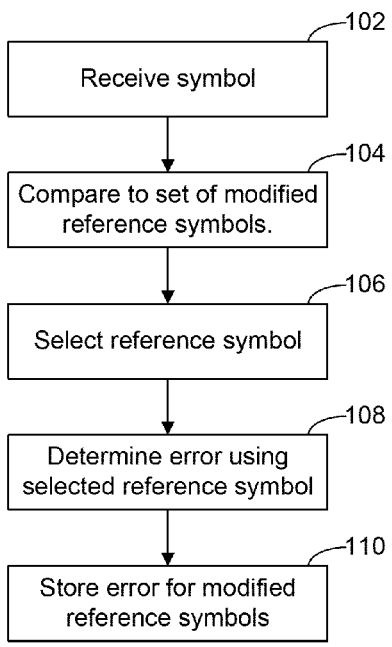
FIG. 2 is a high level flow chart of a process of adjusting or modifying reference symbols for the decoding system illustrated in FIG. 1, according to another exemplary embodiment.

With reference to FIG. 2, receiver 10 can perform a method 100 in which a symbol is received at a step 102. At a step 104, the received symbol is compared in compare circuit 14 to a set of reference symbols. In one embodiment, a series of input symbols in I and Q format are correlated with a series of reference symbols in I and Q format and individual input symbols are selected for comparison with reference symbols. In one embodiment, the reference symbols are modified reference symbols provided by modified reference symbol circuit 22. In one embodiment, modified reference symbols are updated and stored in modified reference symbol storage circuit 22. In another embodiment, the error factor is applied to each reference symbol before its use in compare circuit 14. In this embodiment, an error factor (e.g., an average error) is stored for each reference symbol, and each reference symbol is stored in reference symbol storage 28.

In a step 106, the reference symbol or modified reference symbol corresponding to the received symbol is selected. In a step 108, an error parameter is calculated using the selected modified reference symbol and the received symbol at a step 108. At a step 110, the error parameter for the reference symbol is stored. The stored error parameter can be used for modifying reference symbols in modified reference symbol circuit 22. Alternatively, the error parameter can be directly applied to one of the stored reference symbols in storage 28. The error parameter can be in a radians of phase error format or an I and Q format.

After step 110, method 100 can return to step 102 and process an error value for the next input symbol. Although specific steps for method 100 are shown in FIG. 2, method 100 can be modified. Other algorithms can be utilized to provide modified reference symbols without departing from the scope of the invention. The steps of method 100 can be performed in a different order to that shown in FIG. 2.

Figure 3:
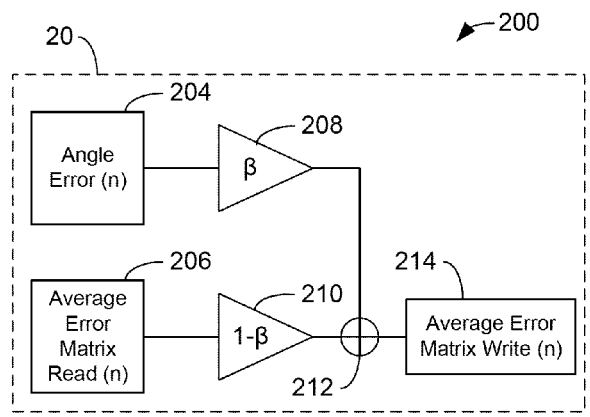
FIG. 3 is a more detailed block diagram of an exponential averaging circuit for use in the decoding system illustrated in FIG. 1, according to yet another exemplary embodiment.

With reference to FIG. 3, an exponential averaging circuit is provided for use in decoder 20. In one embodiment, circuit 200 is disposed in error circuit 21. Exponential average circuit 200 receives an error parameter (e.g., instantaneous error for a symbol) from error generator 24. The error parameter can be equal to the phase difference between the input symbol and the reference symbol. The error between the input symbol and the reference symbol can be converted to a phase error from an error in a baseband I, Q format. Alternatively, the error can be calculated in a phase error format after the reference symbol and input symbol are converted to a phase format. According to another alternative, the error can be calculated in the base band format and applied to the reference symbols in the baseband format. The error parameter is associated with a particular reference symbol for use in modifying the particular reference symbol in modified reference symbol circuit 22 (FIG. 1).

Exponential average circuit 200 includes a read memory 204 for storing the error parameter (e.g., angle error (n)) for each input symbol received.) Circuit 200 also includes a read memory 206 for accessing average errors stored for previous reference symbols. Exponential averaging circuit 200 stores the average error calculated by error generator 24 in a phase format for use with parameters in memory 206 in one embodiment. Memory 204 can store the angle error at an address corresponding to the current reference signal or symbol . . . .

Circuit 200 also includes a scaling multiplier 208, a scaling multiplier 210, a summer 212 and a write memory 214. The error in phase angle for the reference symbol is scaled by a factor of β. Similarly, average error for the selected reference symbol is scaled by a factor of (1−β) by scaling multiplier 210. β is a factor less than 1 and serves as an exponential averaging factor also known as a forgetting factor. The scaled values of the angle error and the average error are summed in summer 212. The sum (Average error (n)=Average error (n) (1−β)+β error (n)) is stored in write memory 214. The write memory 214 is used to store the new average error (n) value in memory 206 and can be used by circuit 22 to modify the relevant reference symbol.

Figure 4:
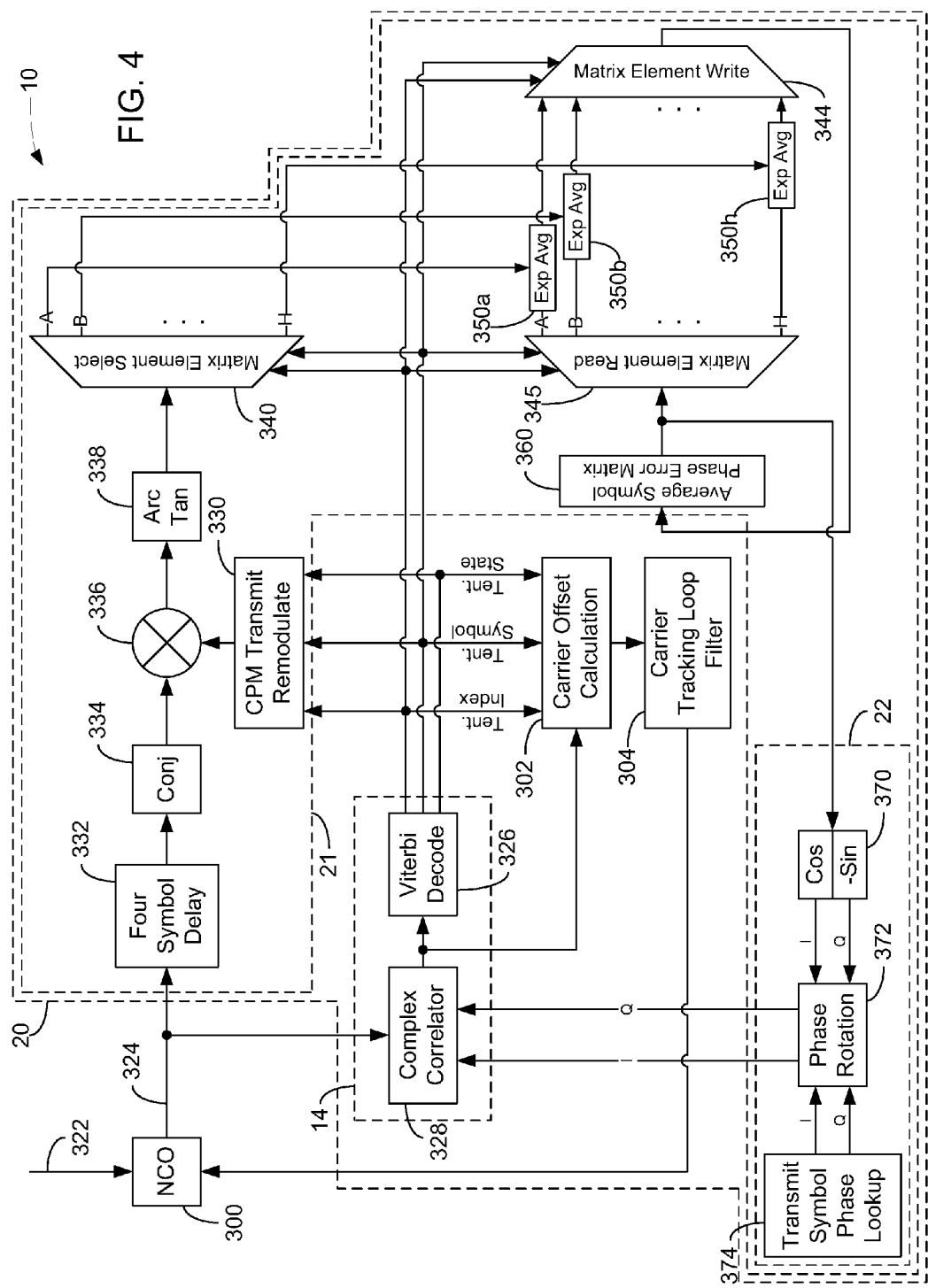
FIG. 4 is a more detailed block diagram of a decoding system including an error circuit for adjusting or monitoring reference symbols, according to still another exemplary embodiment.

With reference to FIG. 4, receiver 10 includes a numerical controlled oscillator (NCO) 300 and decoder 20. Decoder 20 includes error circuit 20, compare circuit 14, carrier offset calculation circuit 302 and a carrier tracking loop filter 304. Compare circuit 14 includes a complex correlator 328 and a Viterbi decoder 326. Receiver 10 in FIG. 4 can be implemented in high speed hardware logic, a digital signal processor or combination thereof in one embodiment.

Numerically controlled oscillator 300 receives an input, such as an input of an RF signal or received signal at an input 322. Oscillator 300 provides a series of complex base band receive symbols on a signal path 324. Symbols on signal path 324 are received by compare circuit 14 which operates to compare the complex base band signals to reference symbols in baseband format. Correlator 328 correlates a set of the input symbols to a set of reference symbols in one embodiment. Correlator 328 uses modified reference symbols for the comparison in one embodiment. Virterbi decoder 326 can provide an α symbol type and a modulation index (e.g., h) in response to correlator 328. Alternatively, other types of symbols can be provided.

Symbols from Viterbi decoder 326 are provided to a transmit remodulator 330. The symbols from decoder 326 represent a match between the received symbol and the closest reference symbol associated with the set of known a priori reference symbols provided to decoder 326 from correlator 328.

Error circuit 20 includes a four symbol delay circuit 332, transmit remodulator 330, a conjugation circuit 334, a multiplier 336, an arctangent circuit 338, a matrix element select multiplexer 340, a matrix element read multiplexer 342, a matrix element write multiplexer 344, a set of exponential averaging circuits 350A-H, an average symbol phase error storage circuit 360, a phase-to-IQ translator 370, a phase rotation circuit 372 and a transmit symbol phase lookup circuit 374.

Transmit remodulate circuit 330 receives the reference symbol estimate (e.g., in α and h format) from Virterbi decoder 326 and provides a phase implementation of the symbol to multiplier 336. Multiplier 336 also receives a conjugate of the input symbol in phase format and provides the product to arctangent circuit 338. The product from multiplier 336 represents the error between the modified reference symbols and the input symbol (e.g., in I, Q or phase format). Arctangent circuit 338 provides the phase value of the error associated with the symbol in baseband (e.g., I and Q) format to multiplexer 340.

Four symbol delay circuit 332 provides the appropriate delay so that the appropriate multiplication of reference symbol to the conjugate of the received symbol occurs at multiplier 336. Matrix element select multiplexer 340 is controlled by symbols from Viterbi decoder 326 so that the phase error signal from arctangent circuit 338 is placed in the appropriate exponential averaging memory in exponential averaging circuits 350A-H. Exponential averaging circuits 350A-H can operate similar to the operation of circuit 200 discussed with reference to FIG. 3.

According to one embodiment, the selected exponential averaging circuit of circuits 350A-H receives the instantaneous error (at symbol index n) via multiplexer 340. The selected exponential averaging circuit of circuits 350A-H also receives the previous phase error value associated with the currently selected reference symbol stored in average symbol phase error matrix 360 from matrix read element 345. The selected exponential averaging circuit of circuits 350 A-H combines the average error with the error from multiplexer 340 to obtain a new average error value such as an exponential average error value in one embodiment. Various mathematical operations can be utilized to calculate an average error or an exponential average error without departing from the scope of the invention.

The new average error in the selected circuit of circuits 350A-H is provided into average symbol phase error matrix 360 via matrix element write multiplexer 344.

Phase-to-IQ translator 370 receives the phase error average, from matrix 360 for selected reference symbols and provides the error in a baseband (e.g. I and Q) format. Circuit 370 provides the error parameter in baseband format to phase rotation circuit 372, which rotates the reference symbols in baseband format. The reference symbols are provided by reference symbol phase lookup 374.

Reference symbol phase lookup includes I and Q values which are unmodified in one embodiment. The phase rotated I and Q signals (modified reference symbols in baseband format) are provided to complex correlator 328 where they are compared with the input signal in baseband format. Correlator 328 selects the appropriate modified reference symbol which most accurately compares to the input signal symbol. The modified reference symbol is provided to decoder 326

Decoder 326 can also provide the Viterbi trellis state (e.g., $\lambda_n$) for the symbol to circuit 330 and circuit 302. The state represents the starting phase of the I,Q baseband symbol. The state can be provided to circuit 330 to translate the symbol into baseband format in one embodiment.

Carrier offset calculation circuit 302 and carrier tracking loop filter 304 control the numerically controlled oscillator 300 so that the appropriate baseband signal is provided at signal path 324. Circuits 302 and 304 fine tune the radio frequency. Carrier offset calculation circuit 302 can also receive index, information from symbols and state decoder 326 for use in carrier offset calculations. Index values and symbols can also be used by multiplexers 340 and 342 to select the appropriate circuit 350A-H and control reading and writing to and from matrix 360.

Figure 5:
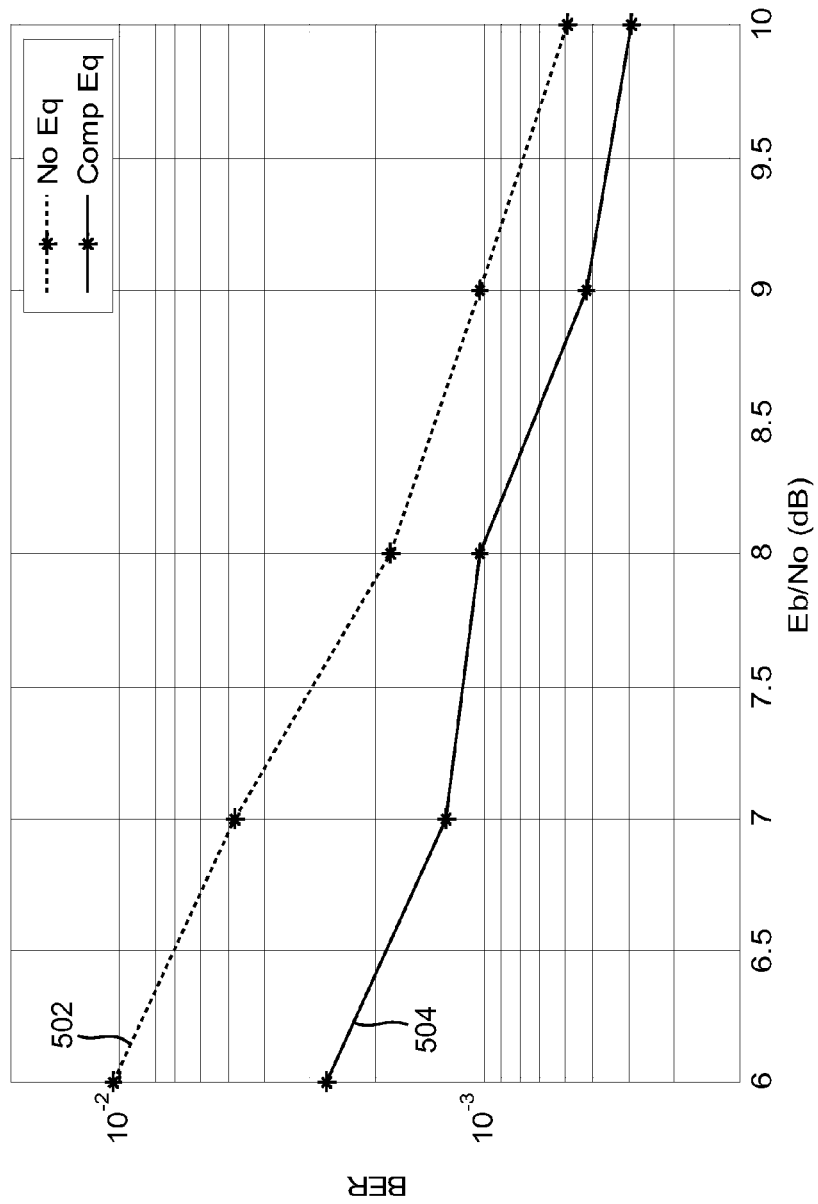
FIG. 5 is a diagram showing bit error rate versus energy per bit over noise spectral density in dB for the system illustrated in FIG. 4 and for a conventional system.

With reference to FIG. 5, a line 502 represents bit error rate of a conventional system in which error circuit 21 (FIG. 1) is not utilized, and a line 504 represents a simulated bit error rate for a system in which error circuit 21 is utilized. FIG. 5 shows that using modified reference symbols instead of ideal reference symbols, reduces bit error rates for ISI corrupted continuous phase modulation. An at least one decibel (dB) performance improvement can be achieved at any energy per bit over noise power spectral density setting in FIG. 5. The CPM signal used in this test has a 1 dB bandwidth of approximately 6100 Hz. The narrow band (NB) channel through which the test signal is transmitted is approximately 4800 Hz. Thus the signal undergoes severe band limiting in this simulation. The band limiting can be due to the narrow-band satellite channel through which the signal is received. Applicant believes performance improvement may be better for less severely band limited modes.

It is understood that while the detailed drawings, specific examples, equations, steps, and particular values given provide one exemplary embodiment of the present invention, the exemplary embodiment is for the purpose of illustration only. The method and apparatus of the invention is not limited to the precise details and conditions disclosed. For example, although specific types of signals and mathematical operations are mentioned, other data and algorithms can be utilized. The various changes between symbol and signal formats (e.g., baseband, trellis, phase error) are not limiting features of the invention unless specifically recited in the claims. Various changes may be made to the details disclosed without departing from the spirit of the invention which is defined by the following claim.

What is claimed is:

1. A method of using a set of reference symbols, comprises:
receiving a first symbol;
comparing the first symbol to the set of reference symbols;
selecting a selected reference symbol from the set of reference symbols, wherein the selected reference symbol is selected in response to the selected reference symbol matching the first symbol; and
adjusting a respective error factor for the selected reference symbol in accordance with a difference between the first symbol and the selected reference symbol, wherein the set of reference symbols are adjusted by a set of respective error factors corresponding to the set of reference symbols, wherein the selected reference symbol is stored and the adjusting uses the selected reference symbol and a phase rotator, the phase rotator applying a respective error factor of the respective error factors to the selected reference symbol.

2. The method of claim 1 wherein the set of reference symbols include $\alpha$, $\lambda$, and h parameters.

3. The method of claim 2 wherein the reference symbols are used in a receiver including a Viterbi decoder.

4. The method of claim 1 wherein the error factors are in a phase domain and the reference symbols are in a complex parameter domain.

5. The method of claim 1 wherein the error factors are average errors.

6. A method of using a set of reference symbols, comprises:
receiving a first symbol;
comparing the first symbol to the set of reference symbols;
selecting a reference symbol from the set of reference symbols, wherein the reference symbol is selected in response to the selected reference symbol matching the first symbol; and
adjusting a respective error factor for the selected reference symbol in accordance with a difference between the first symbol and the selected reference symbol, wherein the set of reference symbols are adjusted by a set of respective error factors corresponding to the set of reference symbols, wherein the error factors are average errors, wherein the average errors are calculated as follows:

New Average Error=$(1-\beta)$*(Stored Average Error)+$\beta$*(New Error) where $\beta<1$, where $\beta$ is an exponential averaging factor.

7. A method of using a set of reference symbols, comprises:
receiving a first symbol;
comparing the first symbol to the set of reference symbols;
selecting a reference symbol from the set of reference symbols, wherein the reference symbol is selected when the selected reference symbol matches the first symbol; and
adjusting a respective error factor for the selected reference symbol in accordance with a difference between the first symbol and the selected reference symbol, wherein the set of reference symbols are adjusted by a set of respective error factors corresponding to the set of reference symbols, wherein the adjusting uses a stored reference symbol and a phase rotator, the phase rotator applying the error factor to the stored reference symbol.

8. The method of claim 1 wherein the first symbol is provided using I, Q parameters.

9. An apparatus for processing an input symbol, the apparatus comprising:
a symbol comparator configured to compare the input symbol to a set of modified reference symbols and provide a selected reference symbol or identification of the selected reference symbol; and
an error generator configured to receive the input symbol and a modified reference symbol associated with the selected reference symbol and configured to provide an error associated with the input symbol, wherein the error generator is configured to modify a stored error factor associated with the selected reference symbol in accordance with the error, wherein error factors for the modified reference symbols are average errors, wherein the average errors are calculated as follows:

New Average Error=$(1-\beta)$*(Stored Average Error)+$\beta$*(New Average Error)

where $\beta<1$ where $\beta$ is an exponential averaging factor.

10. The apparatus of claim 9 wherein the set of modified reference symbols include $\alpha$, $\lambda$, and h parameters.

11. The apparatus of claim 9 wherein the set of modified reference symbols are Viterbi decoder reference symbols.

12. The apparatus of claim 9 wherein the error factors are stored in a phase domain.

13. The apparatus of claim 9 wherein the error generator includes read multiplexers, a write multiplexer and a set of memory locations for storing the average errors for each reference symbol.

14. An apparatus, comprising:
a symbol comparator configured to compare an input symbol to a set of modified reference symbols and provide a selected reference symbol or identification of the selected reference symbol; and
an error generator configured to receive the input symbol and a modified reference symbol associated with the selected reference symbol and configured to provide an error associated with the input symbol, wherein the error generator is configured to modify a stored error factor associated with the selected reference symbol in accordance with the error, wherein the error generator includes read multiplexers, a write multiplexer and a set of memory locations for storing the error factors for each reference symbol, wherein the error generator includes a phase translator for applying the stored error factor to a stored reference symbol to provide the modified reference symbol.

15. A receiver, comprising:
a demodulator for providing a complex base band signal; and
an error circuit for modifying a reference symbol in accordance with an error, wherein the reference symbol is in a set of reference symbols, and wherein the error is associated with a difference between a remodulated reference symbol and a complex baseband input symbol, wherein the error circuit multiplies the conjugate of the input symbol by the remodulated reference symbol to determine the error for the remodulated reference symbol and wherein the error is in a complex baseband domain, wherein the error circuit includes read multiplexers, a write multiplexer and a set of memory locations for storing the error for each reference symbol, wherein the error circuit includes a phase translator for applying the error to the reference symbol to provide the remodulated reference symbol.

16. The receiver of claim 15 wherein the set of reference symbols include $\lambda$, $\alpha$ and h parameters.

17. The receiver of claim 15 wherein the remodulated reference symbol is determined using an average error over time for the reference symbol.

18. The receiver of claim 17 wherein the remodulated reference symbol is calculated by phase rotating in response to the average error for the reference symbol.

19. The apparatus of claim 14 wherein the error factors are average errors.

20. The apparatus of claim 19 wherein the average errors are calculated as follows:

New Average Error=$(1-B)$*(Stored Average Error)+$B$*(New Average Error)

where $B<1$ where B is an exponential averaging factor.

* * * * *